May 3, 1932.  H. W. ROGERS  1,856,886
SYNCHRONIZED SOUND AND PHOTOGRAPHY
Filed Nov. 2, 1928  5 Sheets-Sheet 1
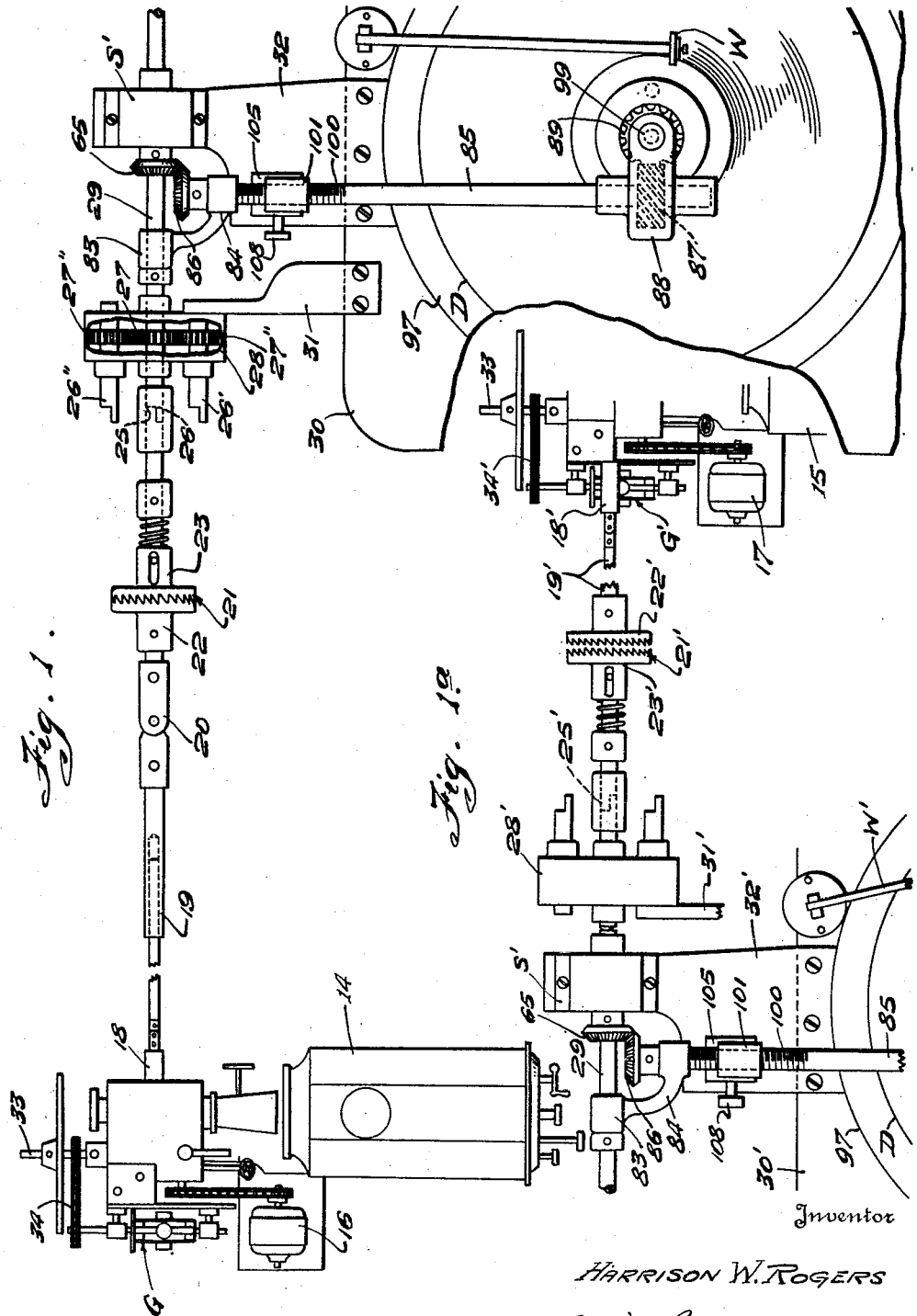
Inventor
HARRISON W. ROGERS
By
Attorney May 3, 1932. H. W. ROGERS 1,856,886
SYNCHRONIZED SOUND AND PHOTOGRAPHY
Filed Nov. 2, 1928   5 Sheets-Sheet 2
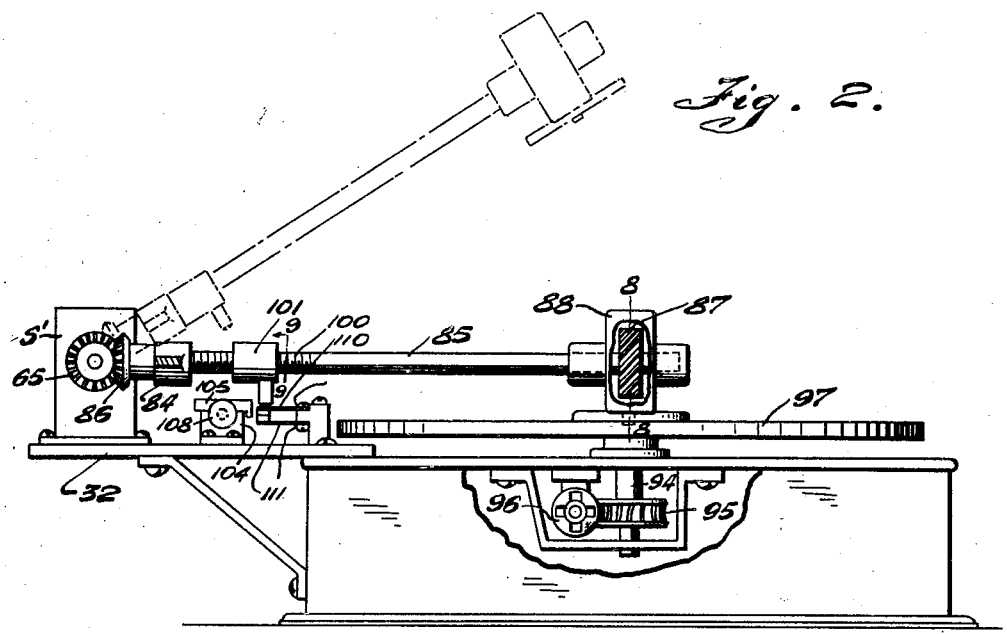
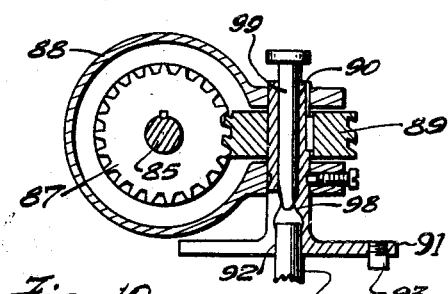
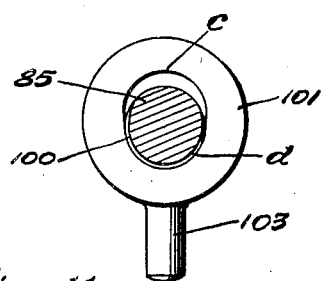
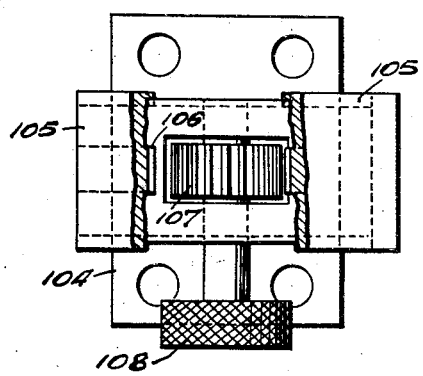
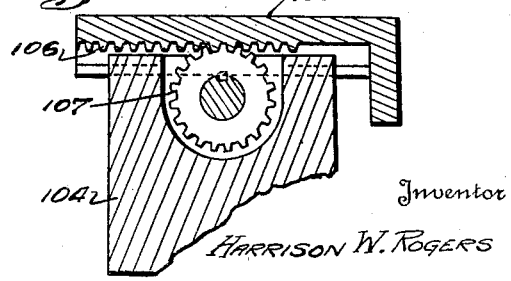

May 3, 1932. H. W. ROGERS 1,856,886
SYNCHRONIZED SOUND AND PHOTOGRAPHY
Filed Nov. 2, 1928 5 Sheets-Sheet 3

Inventor
HARRISON W. ROGERS
By Davin Little Moore
Attorney

May 3, 1932. H. W. ROGERS 1,856,886
SYNCHRONIZED SOUND AND PHOTOGRAPHY
Filed Nov. 2, 1928  5 Sheets-Sheet 4

Inventor
HARRISON W. ROGERS
By
Attorney

Inventor
HARRISON W. ROGERS

Patented May 3, 1932

1,856,886

UNITED STATES PATENT OFFICE

HARRISON W. ROGERS, OF NEW YORK, N. Y.

SYNCHRONIZED SOUND AND PHOTOGRAPHY

Application filed November 2, 1928. Serial No. 316,788.

This invention relates to improvements in synchronized sound and photographic machines, one object of the invention being the provision of a motion picture projector and a sound reproducing machine which may be taken in the broadest sense as a camera and sound recording machine so associated that a synchronizing device operating a switch mechanism is coordinated with a governor-actuated switch device connected to the projector, the first device being operably connected both to the projector and the sound reproducing machine whereby the two switches cooperate in a series circuit to control the motor of the projector machine, the governor-actuated switch permitting a pre-determined speed of the projector while the synchronizer operated switch is controlled by both machines but primarily by the sound reproducing machine to effect a retardation in the operation of the motor of the projector, the main object being to provide a mechanism of this character in which the sound reproducing machine may be operated after the projector has been started and has attained its maximum speed, the slow actuation at the beginning of the sound reproducing machine causing the motor of the projector machine to be reduced in speed until the sound reproducing machine has keyed up to its full speed, thus insuring the proper synchronized action between both machines.

Another object of this invention is the provision of a novel construction of governor-actuated switch operably connected to the projector and a synchronizing device operably connected to the projector and to the sound reproducing machine and coordinated so as to produce the aforementioned result.

With the foregoing and other objects in view, which will appear as the description proceeds, the invention resides in the combination and arrangements of parts and in the details of construction hereinafter described and claimed, it being understood that changes in the precise embodiment of the invention herein disclosed can be made within the scope of what is claimed without departing from the spirit of the invention.

In the accompanying drawings:—

Figures 1 and 1a combined form a top plan view, more or less in diagram of a lay-out showing part of two projectors and two sound recording machines connected for synchronized operation.

Figure 2 is a side elevation partly in section of one of the sound reproducing machines, broken lines indicating the position of the synchronizing operating device elevated.

Figure 8 is a cross-section on line 8—8 of Figure 2 showing the method of connecting a sound record synchronizing operating device to the record and platform or operating shaft.

Figure 9 is an enlarged detail sectional view on line 9—9 of Figure 2.

Figure 10 is an enlarged detail top plan, partly in section, of the adjustable switch controlling member.

Figure 11 is a longitudinal section therethrough.

Figure 7:
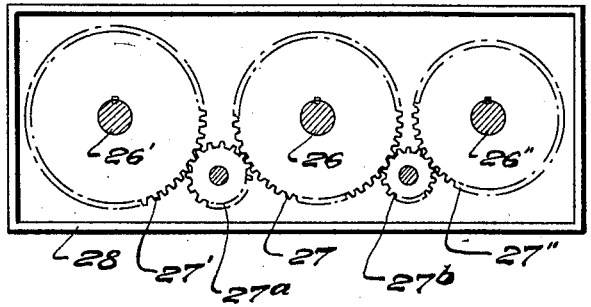
Figure 7 is a plan view of the gearing whereby the projector shaft for controlling the combined synchronizer may be operated at different speeds.

Referring to the drawings, the numerals 14 and 15 indicate, respectively, the two motion picture projecting machines which may be taken as indicative of any type now in use or which are employed for projecting pictures upon a screen, said machines being provided with the respective operating motors 16 and 17. Connected at 18 and 18' to the respective projector machines are the two telescopic shafts 19 and 19', each one of which is connected by a flexible joint 20, as indicated in detail regarding the projector 14 but which is eliminated due to the foreshortening of the shaft as regards the projector 15. Connected also beyond the universal joint 20 are the clutches 21 and 21', one to each machine and each provided with a fixed member 22—22' and slidable spring-set member 23—23', these members being connected at all times and the toothed faces of which are so arranged that when one machine is operating its shaft 19 the clutch member to the opposite machine will ride past its coacting member without imparting rotation to the shaft 19' or vice versa, it being understood that these clutches are normally engaged under all conditions so that the intermediate shaft portion 29, as will presently appear, will be operated by either machine without the manipulation of either one of these clutches. The socket or coupling end 25 or 25' of either one of these shafts is adapted to be coupled with its respective coacting member 26—26' or 26'', according to the speed at which the shaft 29 is to be driven, the casing 28 being provided for the housing of the respective gears 27, 27' and 27'', and the intermediate gears 27ᵃ and 27ᵇ, as clearly shown in Figure 7, it being merely necessary to slide the coupling 25 or 25' out of engagement with its respective coacting member and due to the fact that there is a flexible joint 20 in each shaft, either one of the other coupling members 26' may be engaged.

Interposed between the two projector machines are casings 30 and 30' which represent two sound reproducing machines, the detail construction of which is shown in Figure 2 and which, in turn, is provided with an arm 31 which supports the gear casing 28 and an arm 32 which supports the synchronizer-carrying casing S', there being two of these and the description of one sufficing for both. Each projector, as here shown, is provided with a shutter shaft 33 which, through the chain 34 and the sprocket wheel 39, drives the shaft 38 of the governor-actuated switch mechanism G whose base 35 is detachably connected to the projector. This device, although as here shown connected to the shutter shaft, may be connected to the same shaft to which the coupling 18 is connected upon either side of the projector, it being necessary only that the device be operated from the projector to maintain the desired predetermined speed delivered from the motor 16 or 17 thereof.

Figure 4:
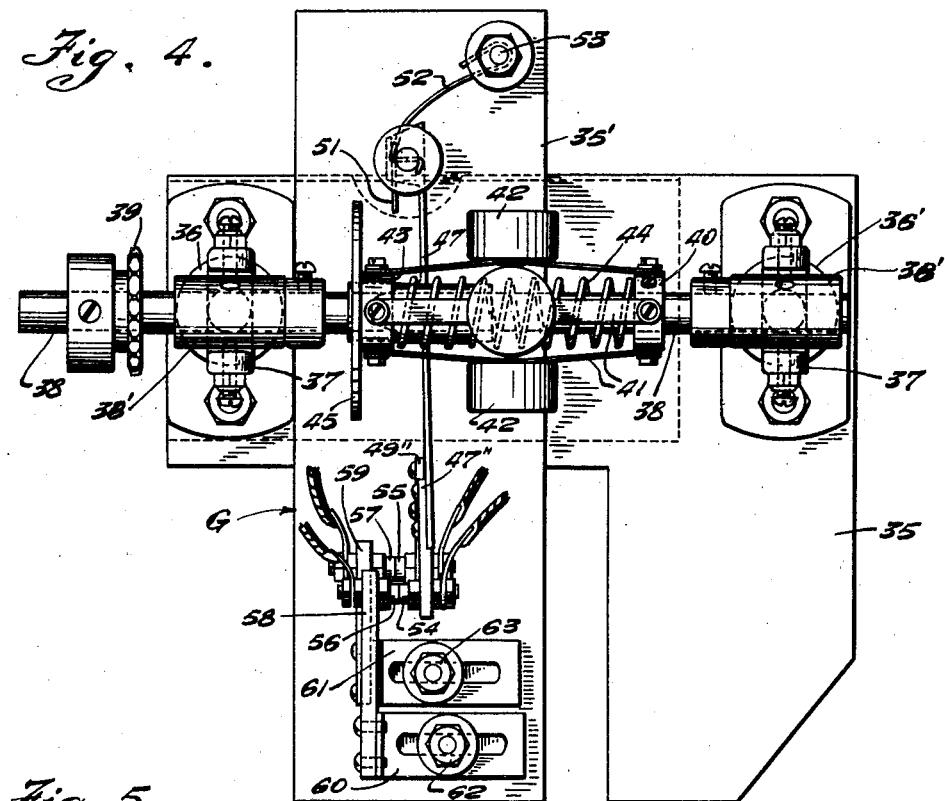
Figure 4 is a side elevation of the complete governor-actuated switch operated by the projector.
Figure 5:
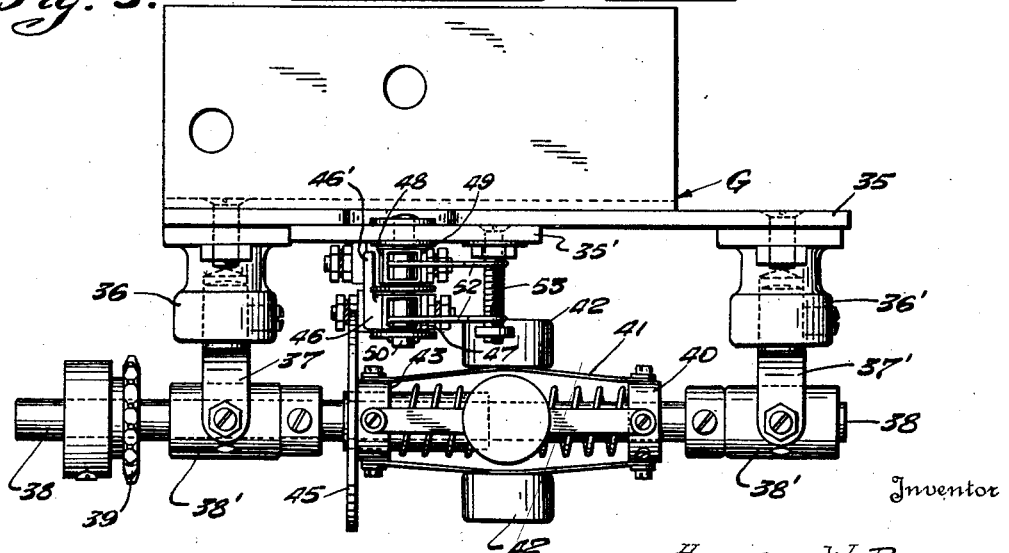
Figure 5 is a top plan view thereof.

The depending plate 35 of this device is provided with two spaced journals 36—36' and the supporting yokes 37 and 37' which receive and carry the bearings 38' of the shaft 38, there being fast to said shaft a collar 40 which is connected through the substantially flat springs 41 carrying the centrifugal weight 42 with the sliding collar 43. This collar 43 is also held outwardly by means of the coil spring 44 so that the disk 45 which is bodily movable with the collar 43 and rotates with the centrifugal device is disposed in the path to engage the projection 46 of the contact-carrying pendant or switch member 47. The overhanging portion 46' of the projection 46 is in the path of but spaced from the projection 48 of the switch operating pendant 49 and the members 47 and 49 are each provided with the box-shaped supporting ends 47' and 49' for receiving the journalling pin 50 to attach the same to the plate of insulation 35' and to receive the free ends 51 of the operating coil springs 52 which, in turn, are supported upon the bolt 53 which regulates the tension thereof and causes the insulating members 47'' and 49'' to be normally moved to the left as viewed in Figure 4 so that the contacts 54 and 55 will be held in contact with the contacts 56 and 57 carried in their respective insulated supports 58 and 59 and, in turn, carried by the adjustable plates 60 and 61 secured by means of the slot and bolt connections 62 and 63 to the present device. By this means the period at which the contacts will open due to the action of the disk 45 upon the respective projections 46 and through the overhanging portion 46' upon the projection 48 will be governed and thereby the speed of the motor transmission to the projector will also be governed.

Figure 3:
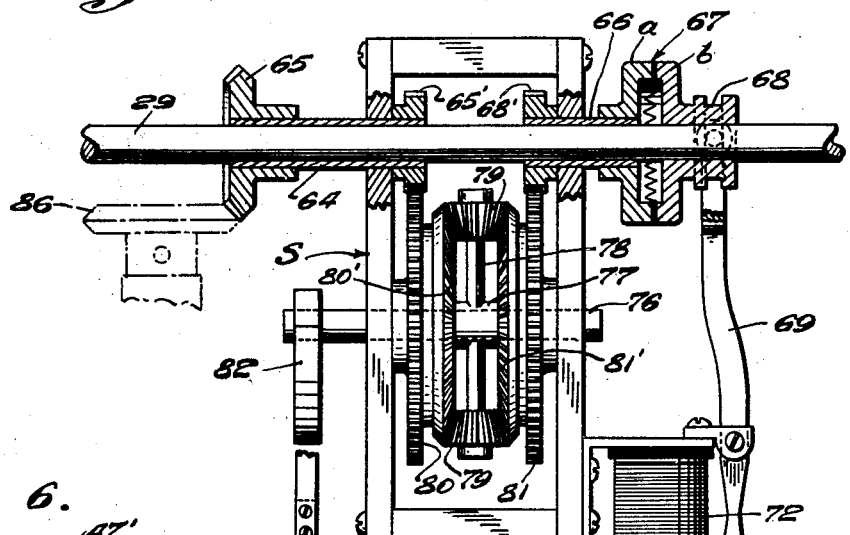
Figure 3 is an enlarged detail sectional view of the synchronizing device controlled both by the sound reproducing machine and the projector.

Mounted upon the shaft 29 for independent rotation are two sleeves 64 and 66, the shaft 64 being provided with a bevel gear 65, the purpose of which will presently appear, while the sleeve 66 is provided with the fixed clutch member $a$ of the clutch 67 and for coaction with the slidable clutch member $b$ which is keyed upon and rotatable with the shaft 29 and is provided with the yoke-receiving spool 68 so that the same may be manipulated through means of the pivoted arm 69. This arm is normally held by the spring 70 so that the clutch is out, the electro-magnet 72 being adapted, when energized, to attract the armature latch 71 to cause it to assume the position as shown in Figure 3 and throw in the clutch, the electro-magnet 74 being employed to attract the armature 73 to release the latch 71 and thus permit the spring 70 to throw out the clutch.

Keyed to the sleeve 64 is a small pinion 65' mounted in the frame S while upon the sleeve 66 is a small pinion 68', these pinions being normally in engagement with the large gears 80 and 81 provided with the smaller bevel gears 80' and 81' which, in turn, form with the two gears 79 a differential gear mechanism. The arms 78 are carried by a collar 77 which is keyed to the shaft 76 journalled in the frame S, the gears 80 and 81 rotating about said shaft.

Figure 12:
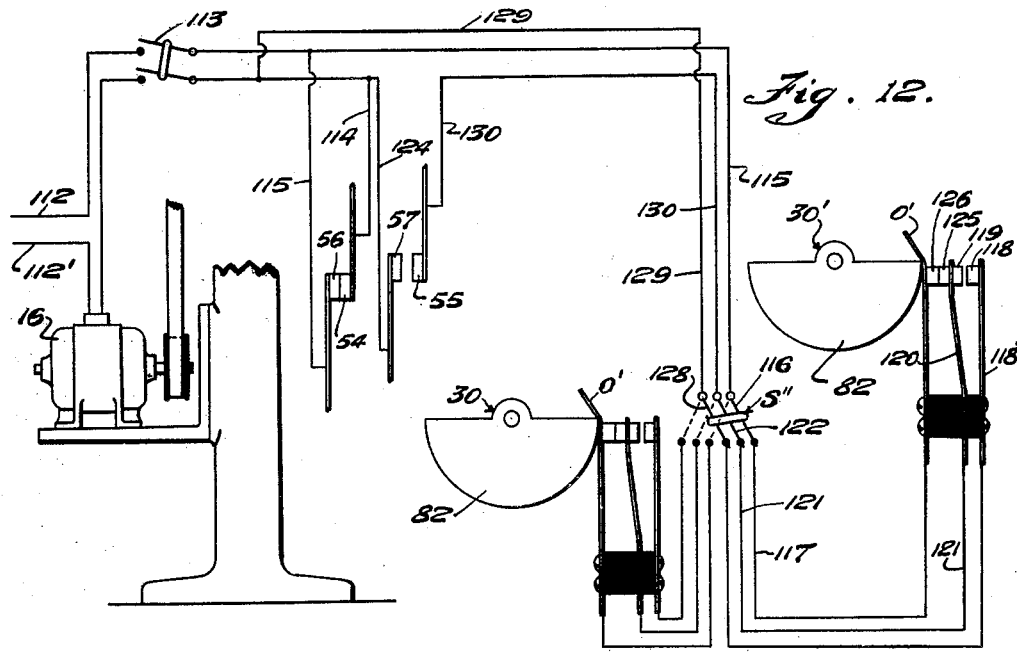
Figure 12 is a diagrammatic view of the electrical circuits used for controlling the projector motor.

Mounted upon one end of the shaft 76 to be movable therewith is a pendant switch-closing member 82 which, as shown in the diagram, Figure 12, is substantially a half circle and will normally, due to the action of gravity, assume the position as shown in that figure.

By this arrangement, when the clutch 67 is in, the shaft 29 will drive the pinion 68' and the gear 81, and when the sleeve 64 is driven, as will presently appear, its pinion 65' will drive the gear 80, and thus the differential action will cause the shaft 76 to be maintained in equilibrium if both sleeves 64 and 66 are operated at the same speed, which is desirable in a device of this character.

Mounted upon the shaft 29 is a sleeve 83 which, in turn, carries an arm 84 which forms a journal for the swingable and rotatable shaft 85, one to each sound reproducing machine, and so said shaft can assume the positions as shown in Figure 2. This shaft, as there shown, is provided upon its outer end with a gear 87 in the detachable gear casing 88 and operates in turn the gear 89 keyed to the shaft 90 so that said shaft forms the driving shaft for the shaft 85 and, consequently, the gear 80 of the synchronizing device. A disk 91 is provided integral with the shaft 90 and is adapted to rest upon the platform 97 of the sound reproducing machine so that the pin 93 thereof will engage in an opening in a record not shown, while the central opening 92 will engage the drive shaft or vertical pin 94 of the sound reproducing mechanism and through which the platform and record are rotated. A gear 95 is mounted upon the shaft 94 and this, in turn, is operated by the electric motor 96. Thus, when the parts are in the position shown in Figure 2 and the motor is energized, the platform 97 and its record will be rotated, and as the clutch 98 carried by the sleeve 90 engages the upper end of the shaft 94 and therefore connects the member 90 thereto, the same being operable through the finger plunger 99 for release or engagement, the shaft 85 will be operated.

Formed upon the shaft 85 adjacent the inner journalled end thereof are a plurality of threads 100, and mounted loosely upon the shaft is a sleeve 101 which, as shown, is provided with an internal semicircular portion $d$ and a smooth portion $c$ at the upper portion, thus providing a means whereby when the shaft 85 is raised to the dotted line position in Figure 2, and as shown in Figure 9, the sleeve 101 will fall to bring the smooth portion $c$ into engagement with the shaft 85, the movement of the same to the full line position causing the mutilated threads $d$ to engage the threads 100 so that the rotation of the shaft 85 will cause the sleeve 101 to be moved from left to right, as viewed in Figure 2, so that the lug 103 thereof will engage and close the switch 110 and 111. In order to regulate the time at which this switch is to be closed, there is provided a support 104 adjacent and below the shaft 85 and provided with the adjustable shelf 105 having the teeth 106 and the rack 107 controlled by the milled nut 108. Thus, when the lug 103 is placed on top of the shelf and the shelf is adjusted for, say, three rotations of the platform 97 before the lug 103 is released to close the switch 110 and 111, the telephone circuit which is connected with the electrical pick-up W is not energized or closed until the desired point of sound rendition from the record. By this means a very simple device is provided for accomplishing this result.

Figure 13:
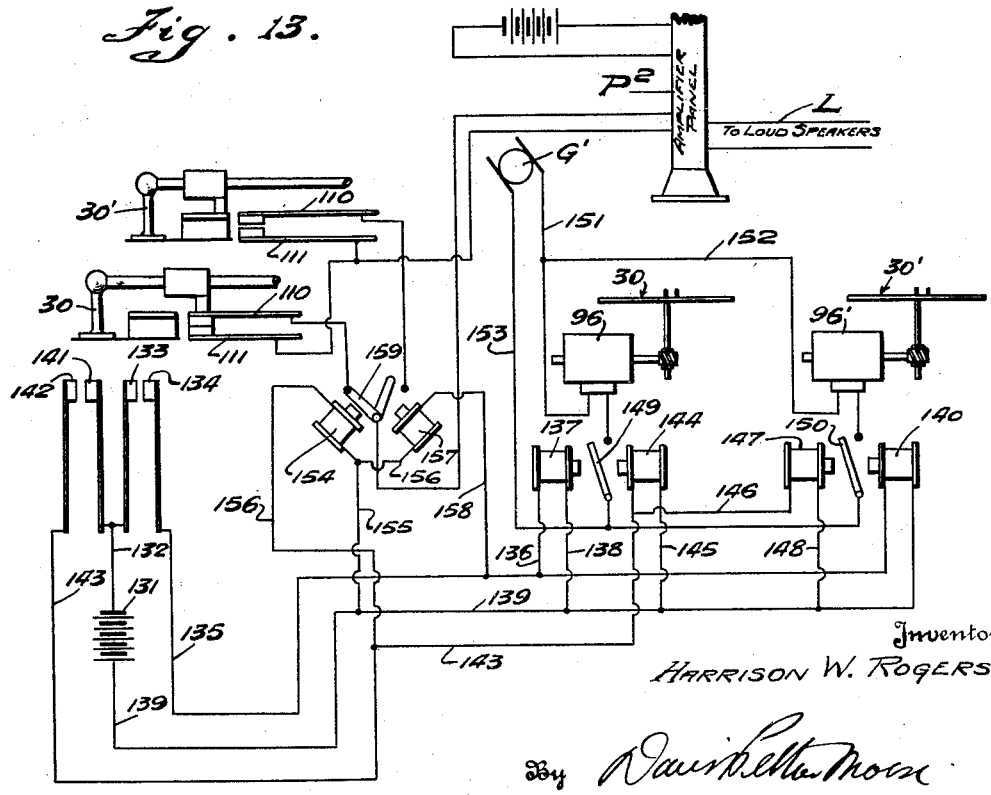
Figure 13 is an electrical diagram for the operation and selection of the various sound reproducing machines from the film and for the connection of the loud speaker circuit to the sound reproducing machines.

The two electrical diagrams as shown in Figures 12 and 13 should be considered as one, as they are both interconnected and operate to produce the result to be attained, namely: to maintain the speed of the projector in proper ratio, or in synchronism with the sound reproducing machine, and to encase the sound reproducing machine should the governor be set and started at a greater speed than is desirable for proper sound rendition, in which event, the pendulum 82 will operate a switch that shunts the governor switches from the motor circuit and places the motor in full circuit connection with the line source, so that the motor to the projector will be operated at full speed and not be governor controlled, it being necessary for the operator to readjust or cut down the speed of the sound reproducing machine until both machines are running at their desired speed ratio for the best possible production.

One electrical installation for carrying this into effect is shown in Figures 12 and 13, and is as follows:

Assuming that machine 30' is to be started, as is also the motor 16, the motor 16 is started by closing the switch 113, and its circuit includes the conductor 112' which is fed by current from any source, (not shown), the motor 16, one member of switch 113, the conductor 124, contacts 57 and 55, the conductor 130, member 122 of switch S'', the conductor 121, spring 120, contacts 125 and 126, conductor 117, member 116 of switch S'', conductor 115, remaining member of switch 113, and the conductor 112.

It will thus be seen that as long as contacts 125 and 126 are closed, and also that the governor contacts 55 and 57 are closed, the motor 16 will be running at the desired speed, the governor having been adjusted to maintain said motor at the desired speed, and in usual practice, at approximately 90 R. P. M. At this time, the film-actuating switch, which is shown in detail in my U. S. Patent No. 1,254,-

436, dated January 22, 1918, and in diagram in Figure 13, will be operated by the film in the projector 14 and the contacts 141 and 142 will be momentarily closed and through the following circuit will start the motor 96 of the sound reproducing machine 30, and when two sound reproducing machines are used, as here shown, the motor 96' of the machine 30' is cut out, as will presently appear. The circuit closed by the contacts 141 and 142, includes the battery 131, the conductor 132, the contacts 141 and 142, the conductor 143, the electro-magnet 144, and the conductors 145 and 139, and as the switch controlling electro-magnet 147 is connected by conductors 146 and 148 in parallel with the electro-magnet 144, the electro-magnet is simultaneously energized, the switch 150 being opened and the switch 149 being closed. The circuit for energizing the motor 96 includes the generator G', the conductor 151, the motor 96, the switch 149, and the conductor 153, while that to energize the motor 96' includes the generator G', the conductors 151 and 152, the motor 96', the switch 150 and the conductor 153. Where so desired, the hand switch may be interposed between the switches 149 and 150, respectively, to be manipulated at the start, or when the performance is at an end.

When the contacts 133 and 134 are closed by the film, the motor 96 is cut out and the motor 96' is energized, and the circuit includes the battery 131, the conductor 132, the contacts 133 and 134, the conductors 135 and 136, the electro-magnet 137, and the conductors 138 and 139. As the electro-magnet 140 is connected in parallel with the electro-magnet 137, the switch 150 is closed simultaneously with the opening of the switch 149.

In order that a sound amplifying circuit may be selected simultaneously with the energization of the electro-magnets 144 and 147, and 137 and 140, respectively, the electro-magnets 154 and 157 are connected in parallel with the circuits from the above, that is, electro-magnet 154 is energized simultaneously through the conductors 155 and 156 when the electro-magnets 144 and 147 are energized, while the electro-magnet 157 through the conductors 155 and 158 is energized when the electro-magnets 137 and 140 are energized.

When the electro-magnet 154 is energized, the V switch 159 is thrown to connect the contacts 110 and 111 of the machine 30 to the amplifier panel P², and, in consequence, to the loud speaker connections L, while when the electro-magnet 157 is energized, the contacts of the machine 30' are placed in circuit with the panel.

This arrangement connects the electrical pick-ups W and W', respectively, with the amplifying panel so that either one of the sound reproducing machines can be connected for sound rendition.

As before described, the member 100 for closing the respective contacts 110 and 111 is adjusted so that at the proper time after the switch 159 is closed, and after the sound rendition portion of the record has been presented, usually requiring three revolutions of the turntable before this happens, the member 101 falls and engages the contacts 110 and 111, and thus closes the amplifying circuit and, as previously stated, at the point of the beginning of sound rendition.

When the motor 96 was energized, the gear 86 operated the gear 65 and, consequently, the sleeve 64, to rotate gears 65' and 80, and as the clutch member b of clutch 67 was thrown in the gears 68' and 81 were rotated. By this means the differential gearing of the synchronizer device was set in motion and the pendulum 82 affected and moved in an anti-clockwise direction. Under normal conditions, perfect synchronism between the sound reproducing machine and the projector will now result, and the governor controlled contacts will be the only ones operated to maintain the proper speed in the projector.

Figure 6:
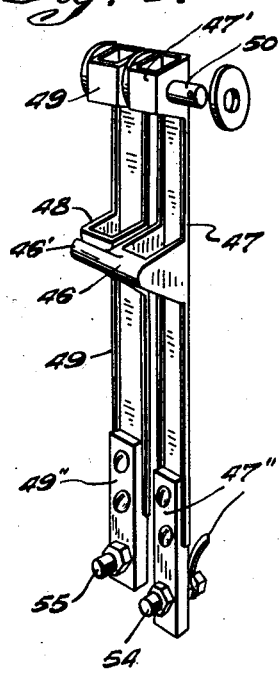
Figure 6 is an enlarged perspective view of the movable switch members forming a part of the governor-actuated switch.

As the contacts 54 and 56 are closed, the motor 16 is operating under the control of its governor G and the parts are in the position shown in Figure 6, with both sets of contacts 55 and 57 and 54 and 56 closed. Should the motor 16 speed too high, the governor disk will first open contacts 54 and 56 and through the projection 46' open the contacts 55 and 57, thus cutting the energy from the motor 16 and not cutting in again until the governor has been actuated to release the projections 46 and 46' and permit the contacts above mentioned to close.

Should the motor 96 attain too high a speed, the pendulum 82 will be moved anti-clockwise until it assumes a position approximately at right angles to that shown in Figure 12, at which time it will engage the end o' of the spring 126 and, through the movement thereof to the right, cause the spring 120 to be moved, and through contact 119 engage the contact 118 of the spring 118'. This action causes the shunting of the contacts 55 and 57 and 54 and 56 and connects the motor 16 directly with the full line current, the motor then speeding up to actuate the shaft 29 and sleeve 66 to operate its gear 81 and restore the arms 79 and pendant 82 to a normal position and in synchronism with the motor 96 or 96'. This action will release the end o' and permit the spring 120 to move to the left and disconnect its contact 119 from the contact 118 and open the shunt circuit to the motor, thus permitting contacts 55 and 57 and 54 and 56 to control the motor 16 through the governor. This will also permit time for the operator to re-adjust the governor or the current to the motor 96 so that the sound reproducing machine will be reduced in this way to normal speed to, in turn, keep in step or synchronism with the projector. This construction is an emergency construction and is seldom brought into play, as the speed of the sound reproducing motor and its governor and the governor of the projector machine are usually set for the desired speeds; that is, the projector for approximately 90 to 93 R. P. M., and the sound reproducing turn table for 33⅓ revolutions when large records are used, and for 80 R. P. M. when the usual record is employed.

The circuit when the contacts 119 and 118 are closed is as follows:—The line 112', the motor 16, one member of the switch 113, the shunt conductor 129, the member 128 of switch S'', the spring 118', the contacts 119, 118 and 125, the spring 126, the conductor 117, the member 116 of switch S'', the conductor 115, the other member of the switch 113, and the line 112.

I claim:—

1. In combination, two independently motor driven devices, a differential gearing interposed between the two devices and driven from opposite sides by said devices, a circuit including the motor of one device, a governor actuated switch operated by the last mentioned device and in said circuit to control a predetermined speed of the motor of the last mentioned device, and a second switch in said circuit and under the control of the gearing whereby the second device through said circuit controls the speed of the motor of the first device.

2. In combination, two independently motor driven devices, a differential gearing interposed between the two devices and driven from opposite sides by said devices, a circuit including the motor of one of the devices and two switches, one under the control of the last mentioned device and the other under the control of the differential gearing whereby the last mentioned device is held at a predetermined speed until the other device is retarded or accelerated to cause a subsequent operation of the motor of the first device.

In testimony whereof I affix my signature.

HARRISON W. ROGERS.